United States Patent [19]
Oda et al.

[11] Patent Number: 4,779,594
[45] Date of Patent: Oct. 25, 1988

[54] INTAKE SYSTEM FOR AN INTERNAL COMBUSTION ENGINE

[75] Inventors: Hiroyuki Oda; Hiroyasu Uchida; Toru Shiraishi; Shunji Masuda, all of Hiroshima, Japan

[73] Assignee: Mazda Motor Corporation, Hiroshima, Japan

[21] Appl. No.: 39,452

[22] Filed: Apr. 17, 1987

[30] Foreign Application Priority Data

| Apr. 25, 1986 | [JP] | Japan | 61-97706 |
| Apr. 25, 1986 | [JP] | Japan | 61-97707 |
| Apr. 26, 1986 | [JP] | Japan | 61-97075 |
| Apr. 28, 1986 | [JP] | Japan | 61-98866 |

[51] Int. Cl.$^4$ .................................. F02B 15/00
[52] U.S. Cl. ................... 123/432; 123/52 M; 123/308
[58] Field of Search ............ 123/52 M, 308, 432

[56] References Cited

U.S. PATENT DOCUMENTS

| 4,232,640 | 11/1980 | Matsumoto | 123/308 |
| 4,262,639 | 4/1981 | Motosugi et al. | 123/432 |
| 4,319,553 | 3/1982 | Endo | 123/432 |
| 4,323,041 | 4/1982 | Endo et al. | 123/308 |
| 4,519,350 | 5/1985 | Oda et al. | 123/432 |
| 4,543,931 | 10/1985 | Hitomi et al. | 123/308 |
| 4,702,207 | 10/1987 | Hatamura et al. | 123/308 |

FOREIGN PATENT DOCUMENTS

| 57-108428 | 7/1982 | Japan . | |
| 143117 | 8/1983 | Japan | 123/432 |
| 60-101224 | 6/1985 | Japan . | |

*Primary Examiner*—E. Rollins Cross
*Attorney, Agent, or Firm*—Fleit, Jacobson, Cohn & Price

[57] ABSTRACT

An engine intake system including a main intake passage leading through an intake port to a combustion chamber, an auxiliary intake passage branched from the main intake passage and opened to the intake passage, and a control valve provided in the main intake passage and adapted to be opened under a heavy load engine operation and closed under a light load engine operation. A fuel injection valve is provided in the auxiliary intake passage close to the opening of the intake port to the combustion chamber to inject fuel toward the combustion chamber.

19 Claims, 13 Drawing Sheets

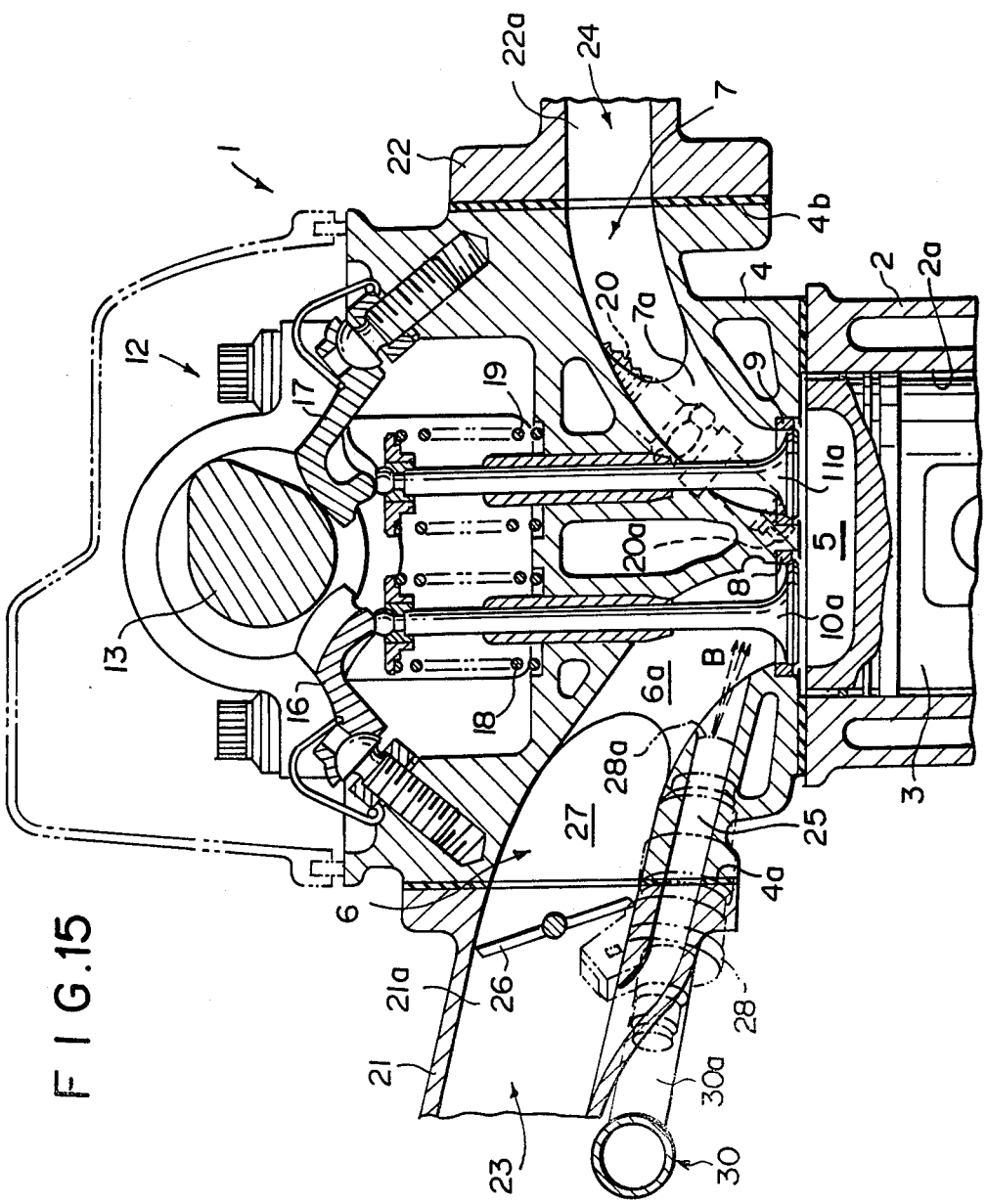

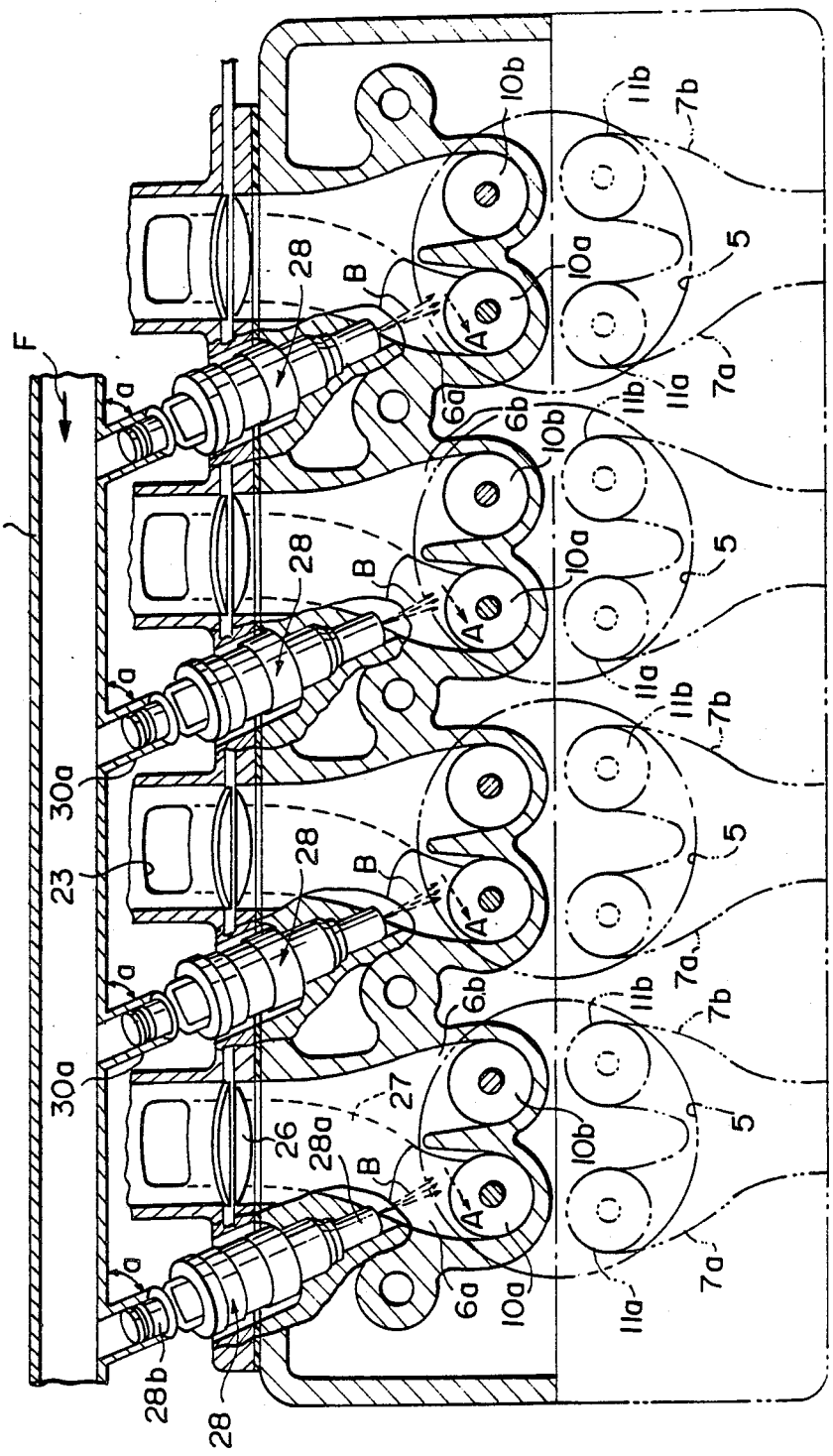

INTAKE SYSTEM FOR AN INTERNAL COMBUSTION ENGINE

BACKGROUND OF THE INVENTION

1. Field of the Invention

The present invention relates to an engine intake system, and more particularly, to an intake system of a fuel injection type engine. More specifically, the present invention pertains to an engine intake system having an intake passage separated into a primary passage and a secondary intake passage, the latter being provided with a shut-off valve which is adapted to be closed under a light load engine operation so that the intake air is drawn to the combustion chamber only through the primary passage under the light load engine operation.

2. Description of the Prior Art

In the field of the engine intake system, there have been various proposals for providing improvements in respect of pollutant emissions and fuel economy. One of such proposals is to divide the intake passage into a primary passage of a relatively small cross-sectional area and a secondary passage of a relatively large cross-sectional area. The secondary passage is provided with a shut-off valve which is adapted to be closed under a light load operation of the engine so that the intake air is drawn into the combustion chamber only through the primary passage under the light load engine operation. Since the primary passage is of a relatively small cross-sectional area, the intake air flow speed can be maintained relatively high even though the quantity of the intake air may be small under light load.

As an example, in the Japanese patent application No. 58-176776 which has been filed on Sept. 24, 1983 and disclosed for public inspection on June 5, 1985 under the disclosure No. 60-101224, there is disclosed an engine intake system having an intake passage which is divided into two branch passages respectively connected with two intake ports opening to the same combustion chamber. Beneath one of the branch passages there is formed an auxiliary passage of a smaller cross-sectional area opening to one of the intake passages. The intake passage is provided with a shut-off valve for closing the intake passage under a light load engine operation. The auxiliary passage is opened to the intake passage upstream of the shut-off valve. It is therefore considered that the auxiliary passage is the primary passage whereas the branch passages constitute the secondary passage.

As regards the fuel supply system, proposals have also been made for a so-called lean mixture combustion system so that improvements are accomplished in respect of fuel economy and pollutant emissions. Such lean mixture combustion system is aimed to provide a stratified mixture charge to the combustion chamber so that a relatively rich mixture is formed in the vicinity of the ignition plug to thereby avoid ignition failure whereas the overall mixing ratio can be made leaner than in a conventional engine. With this type of fuel supply system, it is possible to decrease the amount of pollutant emissions in the exhaust gas. For accomplishing the stratified mixture charge, a preferred fuel supply system is so-called fuel injection system wherein the engine intake passage is provided with a fuel injection valve.

The fuel injection system includes such a type wherein fuel is injected into the intake passage irrespective of the operating cycle of the engine. Another type is the one wherein the fuel injection timing is synchronized with the engine operating cycle such as the one which is disclosed by the Japanese patent application No. 55-184692 filed on Dec. 24, 1980 and disclosed for public inspection on July 6, 1982 under the disclosure No. 57-108428. This type may be called as the "timed injection type" and includes the fuel injection valve for each cylinder. The fuel injection valve may be actuated for a predetermined time period in each cycle of the engine operation for example at the end of the intake stroke. This system is preferable in that a uniform fuel distribution can be ensured among the combustion chambers. the system is further preferable in that the stratified mixture charge can be conveniently accomplished.

SUMMARY OF THE INVENTION

The present invention is directed to an engine intake system including a main intake passage which leads at a junction point to a primary passage and a secondary passage which are opened to the same combustion chamber, and a shut-off valve which is provided in the secondary passage and adapted to close the secondary passage under a light load engine operation. The present invention is further directed to an engine which includes a fuel injection valve for each combustion chamber.

The present invention has an object to provide the best location of the fuel injection valve for the stratified mixture charge.

Another object of the present invention is to provide an engine intake system including a primary intake passage and a secondary intake passage, the latter being closed under a light load engine operation, and a fuel injection valve which is located so that a stable stratification of the mixture charge can be accomplished without fail.

According to the present invention, the above and other objects can be accomplished by an engine intake system comprising combustion chamber means, main intake passage means leading to said combustion chamber means through intake port means, intake valve means provided in said intake port means, control valve means provided in said main intake passage means adapted to be closed under an engine operating condition wherein an intake air flow is small in quantity and opened under an engine operating condition wherein the intake air flow is large in quantity, auxiliary intake passage means branched from said main intake passage means and opened to said intake port means in the vicinity of a portion where the intake port means is opened to said combustion chamber means, fuel injection means provide in the vicinity of a portion wherein said auxiliary intake passage means is opened to the intake port means and having a direction of fuel injection oriented to said combustion chamber means.

The intake valve means generally includes a poppet valve having a valve member constituted by a valve stem and a valve disc. It is preferable that the direction of the fuel injection valve means is offset from the valve stem and oriented toward the space between the valve disc and the valve seat in the intake port when the intake valve is in the open position. The auxiliary intake passage means may be arranged in a tangential direction of the combustion chamber means and the fuel injection valve means may be located at a side of the auxiliary intake passage means. In order to facilitate atomization of fuel, there may be provided a perforated plate opposite to the fuel injection valve means.

The above and other objects and features of the present invention will become apparent from the following descriptions of preferred embodiments taking reference to the accompanying drawings.

BRIEF DESCRIPTION OF THE DRAWINGS

FIG. 15 is a vertical sectional view of a multiple cylinder engine in accordance with a further embodiment of the present invention;

FIG. 16 is a horizontal sectional view of the engine shown in FIG. 15; and,

DESCRIPTION OF THE PREFERRED EMBODIMENTS

Figure 1:
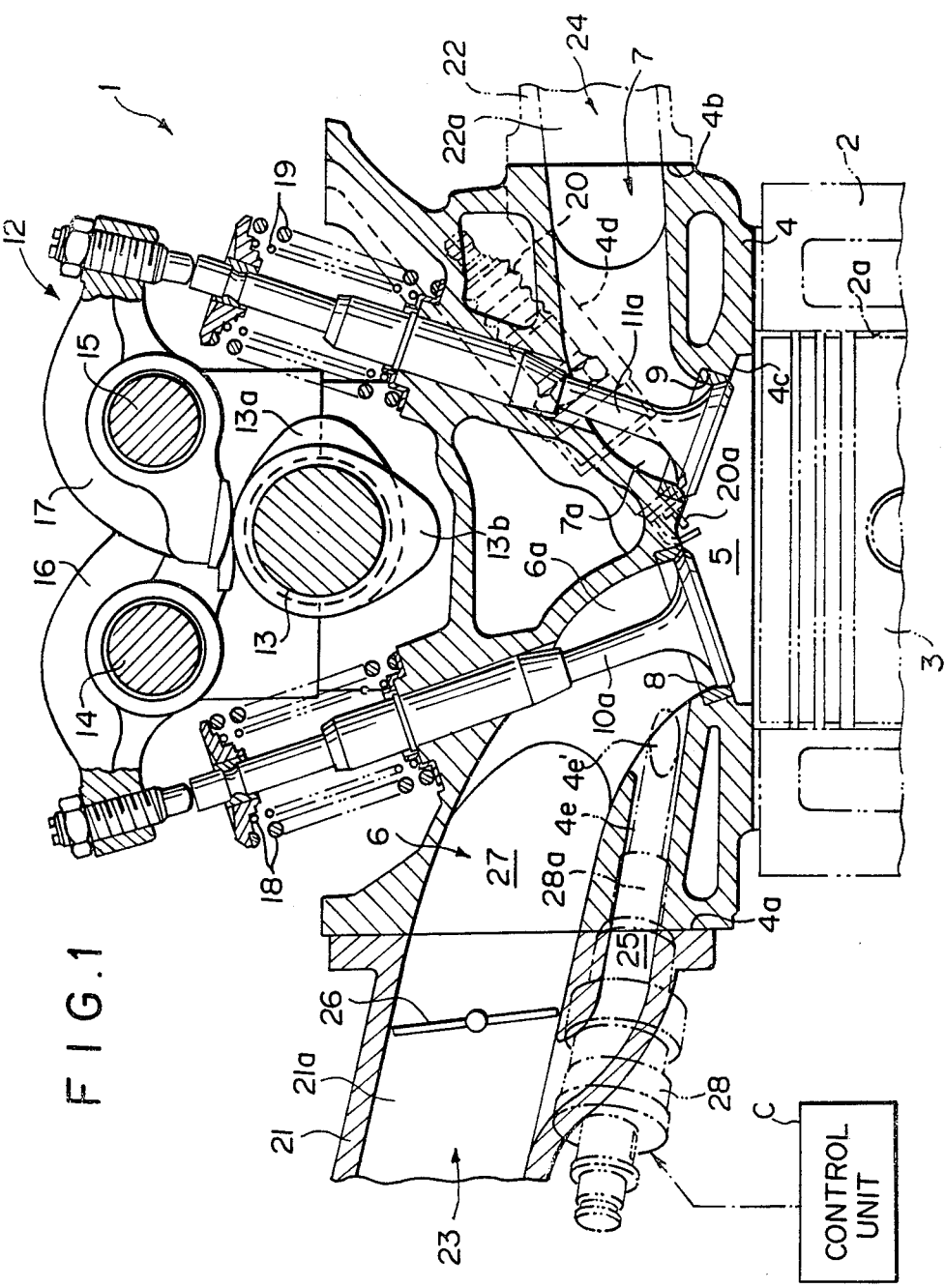
FIG. 1 is a vertical sectional view of an engine in accordance with one embodiment of the present invention.
Figure 2:
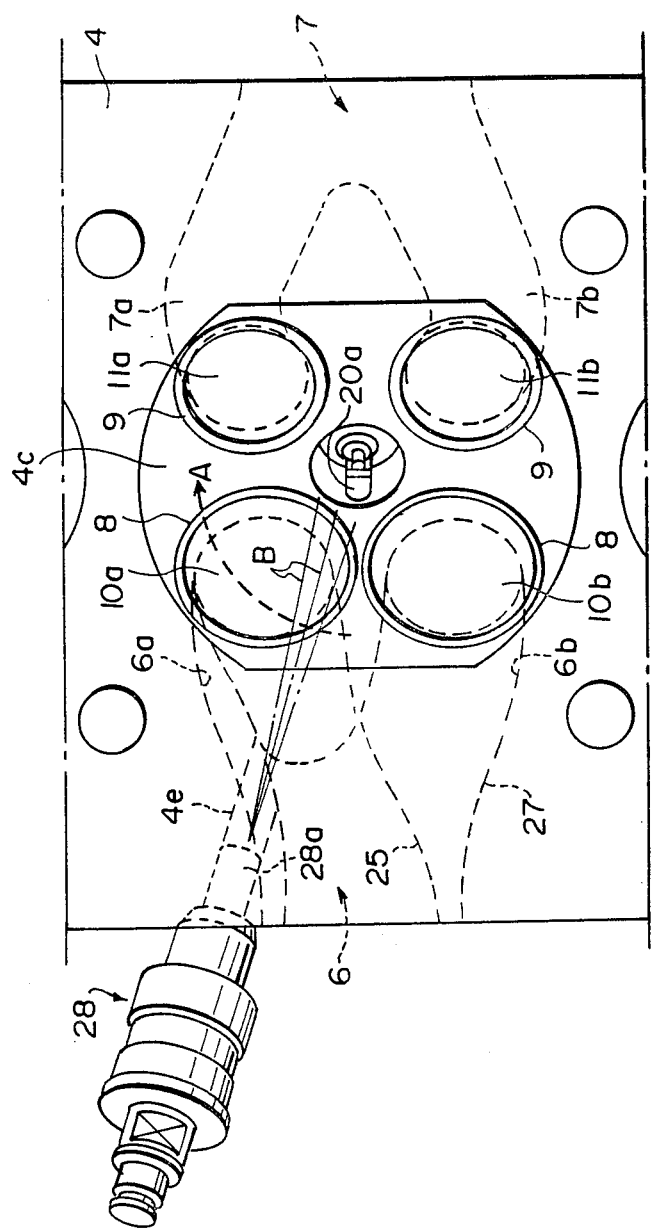
FIG. 2 is a bottom view of the cylinder head used in the engine shown in FIG. 1.

Referring to the drawings, particularly to FIGS. 1 and 2, there is shown an engine 1 including a cylinder block 2 which is formed with a plurality of cylinder bores 2a which are arranged in a line, although only one of the cylinder bore 2a is shown in FIG. 1. In each of the cylinder bores 2a, there is a piston 3 which is axially movable in the cylinder bore 2a. A cylinder head 4 is attached to the top surface of the cylinder block 2 and has a plurality of recesses 4c at positions corresponding to the cylinder bores 2a for providing combustion chambers 5. The cylinder head 4 has opposite side surfaces 4a and 4b and is formed with a common intake port 6 which is opened at one end to the side surface 4a of the cylinder head 4 and connected at the other end with branch intake ports 6a and 6b which are opened to the combustion chamber 5 at the recess 4c. The cylinder head 4 is further formed with a common exhaust port 7 which is opened at one end to the side surface 4b of the cylinder head 4 and connected at the other end with branch exhaust ports 7a and 7b opened to the combustion chamber 5 at the recess 4c. As shown in FIG. 2, the branch intake ports 6a and 6b and the branch exhaust ports 7a and 7b are opened to the combustion chamber 5 at square positions. Intake valve seats 8 are provided at the openings of the branch intake ports 6a and 6b and exhaust valve seats 9 are provided at the openings of the branch exhaust ports 7a and 7b.

The intake ports 6a and 6b are respectively provided with intake valves 10a and 10b which are adapted to cooperate with the valve seats 8. The exhaust ports 7a and 7b are provided respectively with exhaust valves 11a and 11b which are adapted to cooperate with the valve seats 9.

As shown in FIG. 1, the cylinder head 4 is provided at the upper portion with a valve actuating mechanism 12 for actuating the valves 10a, 10b, 11a and 11b. The mechanism 12 includes a cam shaft 13 which extends in the direction of the line of the cylinder bores 2a. Although not shown in FIG. 1, the cam shaft 13 is driven by the engine crankshaft. Above the cam shaft 13, there are provided rocker shafts 14 and 15 respectively carrying rocker arms 16 and 17. The cam shaft 13 has cams 13a and 13b. The cams 13a are engaged with one ends of the rocker arms 16 so that the rocker arms 16 are swingably moved as the cam shaft 13 rotates. The cams 13b are engaged with one ends of the rocker arms 17 so that the rocker arms 17 are swingably moved as the cam shaft 13 rotates.

The intake valves 10a and 10b are held in the closed position by valve springs 18 whereas the exhaust valves are held in the closed position by valve springs 29. The intake valves have valve stems which are engaged with the other ends of the rocker arms 16 so that the swingable movements of the rocker arms produce cyclic movements of the intake valves 10a and 10b. Similarly, the exhaust valves have valve stems which are engaged with the other ends of the rocker arms 17 so that the swingble movements of the rocker arms 17 produce cyclic movements of the exhaust valves 11a and 11b.

As shown in FIG. 1, the cylinder head 4 is formed with a plug hole 4d for installation of an ignition plug 20 which has a discharge electrode 20a. In FIG. 2, it will be noted that the discharge electrode 20a is positioned in the combustion chamber 5 at a location in the square defined by the intake ports 6a and 6b and the exhaust ports 7a and 7b.

An intake manifold 21 is attached to the cylinder head 4 at the side surface 4a. Similarly, an exhaust manifold 22 is attached to the cylinder head 4 at the side surface 4b. The intake manifold 21 has an internal passage 21a which is connected with the common intake port 6 to define a main intake passage 23. The exhaust manifold 22 has an internal passage 22a which is connected with the common exhaust port 7 to define an exhaust passage 24.

Beneath the main intake passage 23, there is formed in the intake manifold 21 and the cylinder head 4 an auxiliary intake passage 25 which is branched from the internal passage 21a in the intake manifold 21 and merged with the branch intake port 6a at a portion slightly upstream of the portion where the branch intake port 6a is opened to the combustion chamber 5. The auxiliary intake passage 25 is small in the effective passage area in relation to the main intake passage 23.

The main intake passage 23 is provided in the internal passage 21a just downstream of the portion where the auxiliary intake passage 25 is branched from the main intake passage 23 with a control valve 26 to define a main passage portion 27 through which the intake air is passed under a heavy load engine operation. The control valve 26 is interconnected with an engine throttle valve (not shown) so that the control valve 26 is opened under a heavy load engine operation but closed under a light load engine operation. It will be understood that the air flow through the main intake passage portion 27 is restricted under a light load engine operation but a free air flow is permitted under a heavy load engine operation.

As shown in FIG. 1, the auxiliary intake passage 25 which is branched from the main intake passage 23 is formed so that it extends substantially horizontally as compared with the main intake passage 23. I will therefore be understood that the air flow through the auxiliary intake passage 25 has a horizontal velocity component than the air flow through the main intake passage portion 27 does.

A fuel injection valve 28 is provided on the cylinder head 4 at a side of the auxiliary intake passage 25 and at a side and lower portion with respect to the common intake port 6. More specifically, the cylinder head 4 is formed with a fuel injection valve installing hole 4e at a side of the auxiliary intake passage 25. The hole 4e is opened to the intake passage portion 27 in an area where the auxiliary intake passage is merged with the passage portion 27. The fuel injection valve 28 is installed on the cylinder head 4 at the hole 4e.

Figure 3:
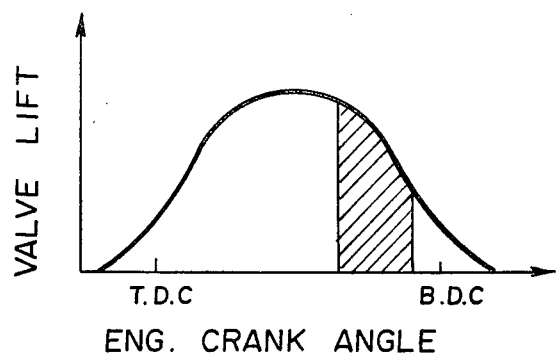
FIG. 3 is a diagram showing the fuel injection timing in an engine operating cycle.

In FIG. 1, it will be noted that the injection valve 28 is positioned so that its axis is oriented substantially in parallel with the auxiliary intake passage 25 in the plane of FIG. 1. It should further be noted in FIG. 2 that the fuel injection valve 28 has an injection nozzle 28a which is oriented such that the discharged fuel is directed toward the center of the circle of the combustion chamber 5 where the discharge electrode 20a of the ignition plug 20 is located. Referring to FIG. 3, the fuel injection valve 28 is actuated to inject fuel in the final period of each intake stroke as shown by a shadowed area. For the purpose, an electronic control unit C is provided as well known in the art.

In operation, under a light load engine operation, the control valve 26 is closed to block the intake air flow through the main intake passage portion 27. Thus, the intake air flow is passed to the combustion chamber 5 only through the auxiliary intake passage 25. Since the auxiliary intake passage 25 is of a small passage area, a relatively high flow speed is ensured even under a light load. In the particular embodiment which is being described, the auxiliary intake passage 25 is formed substantially along the branched intake port 6a and directed tangentially with respect to the combustion chamber 5 as shown in FIG. 2. It will therefore be understood that the intake air introduced into the combustion chamber 5 produces a swirl as shown by an arrow A in FIG. 2. The control valve 26 is opened as the engine load increases so that the intake air is allowed to pass to the combustion chamber 5 through the main intake passage portion 27 as well as the auxiliary intake passage 25 to provide a required engine output.

In the final period of the intake stroke, the fuel injection valve 28 is actuated to thereby discharge fuel to the combustion chamber 5 to form a combustible mixture in the combustion chamber 5. The mixture is then ignited by the ignition plug 20 so that a combustion takes place.

As already described, the injection nozzle 28a of the fuel injection valve 28 is located in the vicinity of the portion where the auxiliary intake passage 25 merges with the main intake passage portion 27 and directed toward the center of the circle of the combustion chamber 5. It will therefore be understood that the fuel injected from the injection nozzle 28 is directed through the space between the valve seat 8 and the valve disc 10a toward the center of the upper portion of the combustion chamber 5 where the discharge electrode 20a of the ignition plug 20 is located. The fuel is thus prevented from depositing on the wall surface of the combustion chamber 5 or the intake valve 10a and concentrated around the discharge electrode 20a of the ignition plug 20 forming a rich mixture. It will therefore be understood that even if the overall mixing ratio is lean, a positive ignition can be ensured without a risk of ignition failure. The swirl of the intake air produced in the combustion chamber 5 functions to make the combustion flame rapidly propagate throughout the combustion chamber 5 so that a desirable combustion of the mixture is ensured even under a light load engine operation.

In FIG. 2, it will be noted that the fuel injected into the combustion chamber 5 intersect the swirl of the intake air so that an improved atomization of fuel is ensured. It should further be noted that the quantity of fuel particles which may accompany the air flow in the swirl will be decreased by this direction of fuel injection so that it is possible to establish an improved stratification of mixture charge.

In the illustrated embodiment, it should be noted that the branched intake ports 6a and 6b are directed so that the intake air introduced through these ports produce swirls which are opposite in direction with each other. The fuel is injected toward the portion where the swirls of the intake air from the two branched intake ports 6a and 6b meet. Therefore, under a heavy load engine operation, an improved fuel atomization can be accomplished.

It should further be noted that the fuel injection valve 28 is located at a side of the auxiliary intake passage 25 and oriented that the axis of the fuel injection valve 28 is substantially parallel with the axis of the auxiliary intake passage 25 in the plane of FIG. 1 or the plane perpendicular to the axis of the engine output shaft. Thus, the fuel injected from the injection valve 28 has a strong horizontal velocity component as the intake air flow through the auxiliary intake passage 25 does. It will therefore be understood that the injected fuel has a tendency of being concentrated in the upper portion of the combustion chamber 5, particularly around the discharge elecrode 20a of the ignition plug 20. This will apparently result in an improved combustion of the mixture.

In the particular embodiment which is being discussed, the fuel injection valve 28 is actuated in the final period of the intake stroke wherein the valve lift is to a certain extent decreased. It will therefore be understood that the injected fuel is prevented by the valve disc from being diffused in a downward direction so that the stratification of the mixture charge will be further enhanced. A part of the injected fuel will be brought into contact with the valve seat 8 at a portion adjacent to the ignition plug 20 to be vaporized by the heat of the valve seat 8. Thus, it is possible to accomplish a better ignition.

Figure 4:
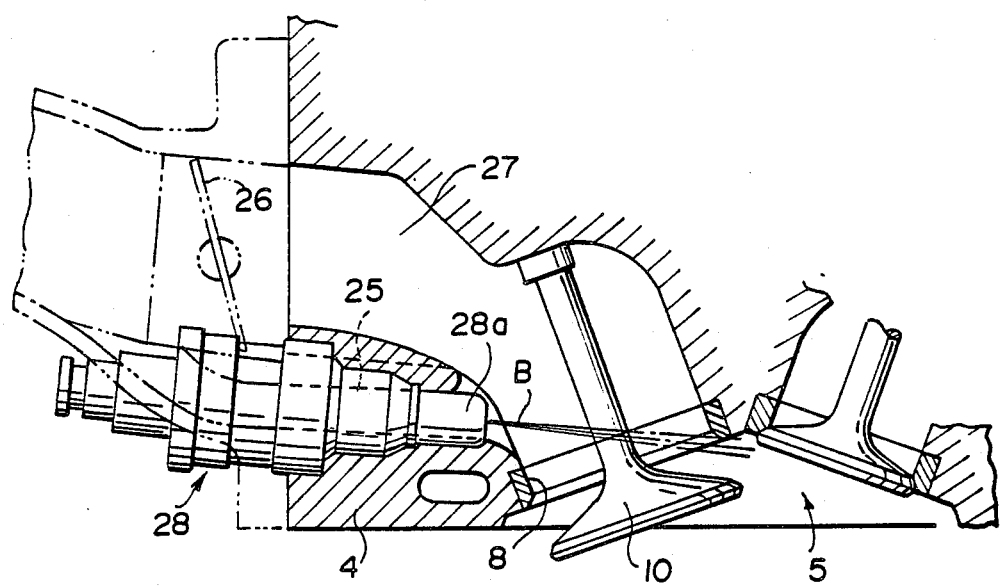
FIG. 4 is a fragmentary sectional view of an engine intake system showing another embodiment of the present invention.
Figure 5:
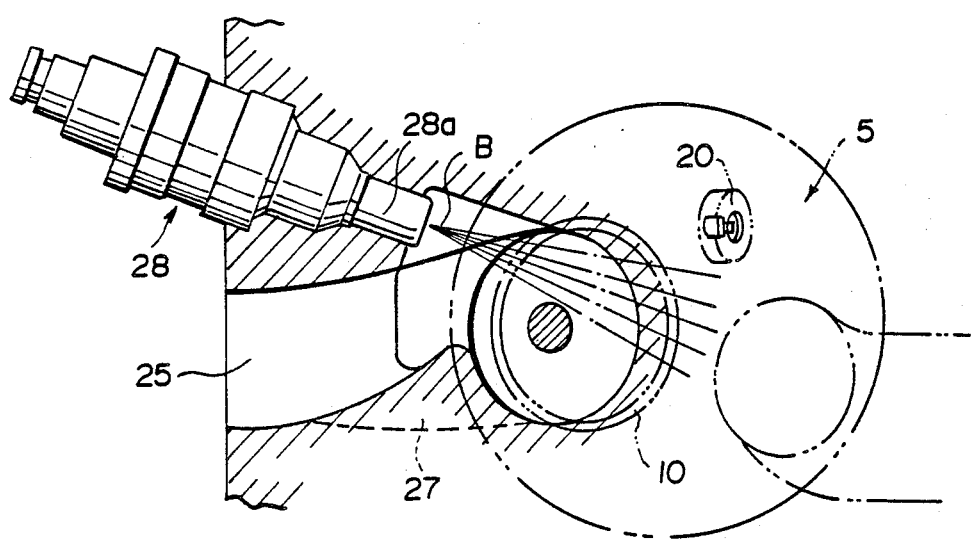
FIG. 5 is a bottom view of the cylinder head used in the engine intake system shown in FIG. 4.
Figure 6:
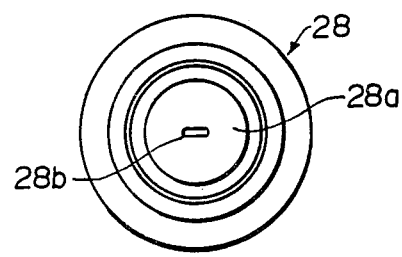
FIG. 6 is an end view of the fuel injection valve showing the configuration of the fuel injection nozzle.

Referring now to FIGS. 4 through 6, the embodiment shown therein is substantially the same as the previous embodiment so that corresponding parts are shown with the same reference numerals and detailed descriptions will not be made. In this embodiment, the fuel injection valve 28 has a nozzle opening 28b in the injection nozzle 28a, which is of an elongated configuration in the horizontal direction as shown in FIG. 6. It will therefore be understood that the fuel is injected in a pattern which is thin in the vertical direction but is spread in the horizontal direction as shown by B in FIGS. 4 and 5. Thus, the injected fuel is concentrated in the upper portion of the combustion chamber 5 to provide a stratified mixture charge. The embodiment is advantageous in that the fuel can be injected into the combustion chamber 5 with less quantity of fuel which is deposited on the valve disc and the valve seat 8.

Figure 7:
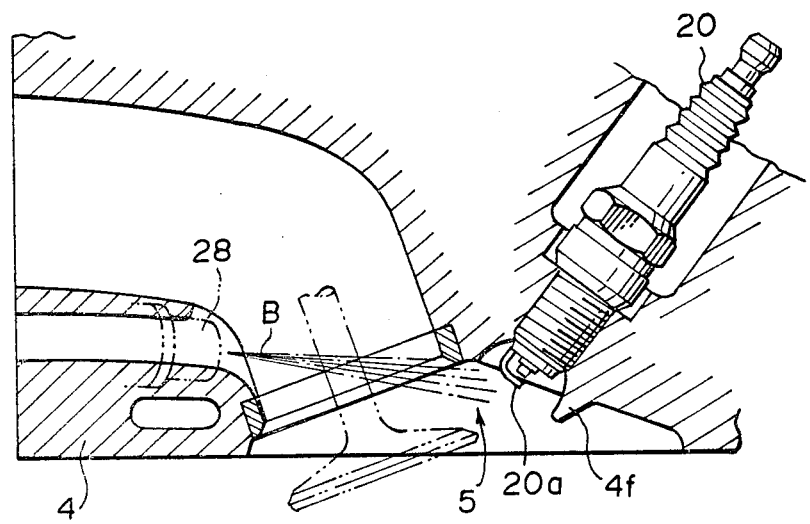
FIG. 7 is a sectional view similar to FIG. 4 but showing a further embodiment.

FIG. 7 shows a further embodiment of the present invention in which the cylinder head 4 is formed with a ridge 4f located behind the discharge electrode 20a of the ignition plug 20 as seen in the direction of the injected fuel stream. The ridge 4f functions to prevent the injected fuel from passing through the area where the ignition plug 20 is located. This will make the fuel particles concentrate around the discharge electrode 20a of the ignition plug 20 so that a better ignition property can be obtained.

Figure 8:
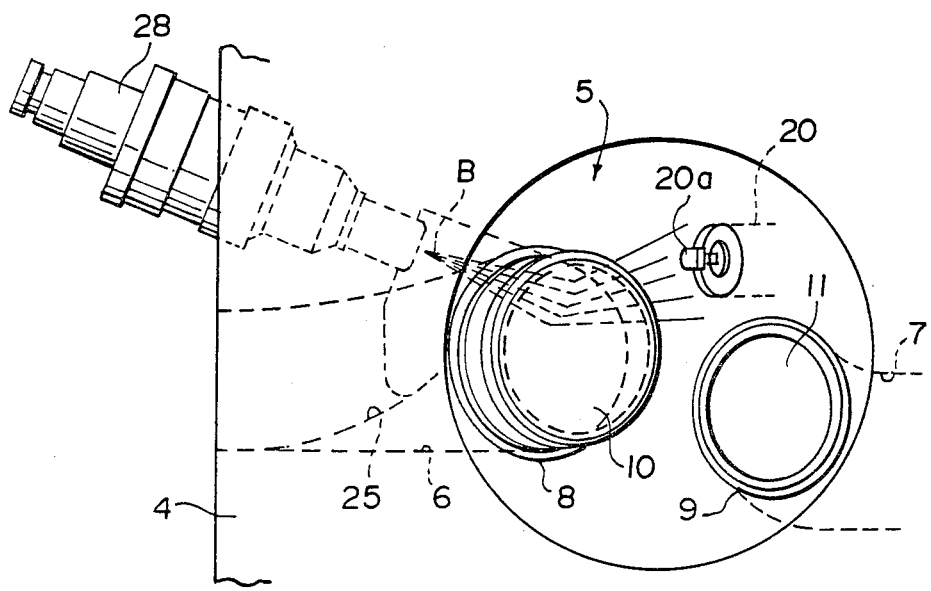
FIG. 8 is a bottom view of a cylinder head showing another embodiment of the present invention.

Referring to FIG. 8 which shows a further embodiment of the present invention, it will be noted that the ignition plug 20 having the discharge electrode 20a is offset sidewardly from the center of the combustion chamber 5. The cylinder head 4 is formed with a single intake port 6 and a single exhaust port 7 which are opened to the combustion chamber 5. An intake valve 10 is provided in the intake port 6 and an exhaust valve 11 is provided in the exhaust port 7. As in the previous embodiments, an auxiliary intake passage 25 is formed. In this embodiment, the fuel injection valve 28 is provided so that the fuel discharge is directed toward the upper center of the combustion chamber 5. In order that the discharged fuel particles are concentrated around the offset ignition plug 20, the arrangement is such that the injected fuel stream is deflected by the valve disc of the intake valve 10 toward the ignition plug 20.

Figure 9:
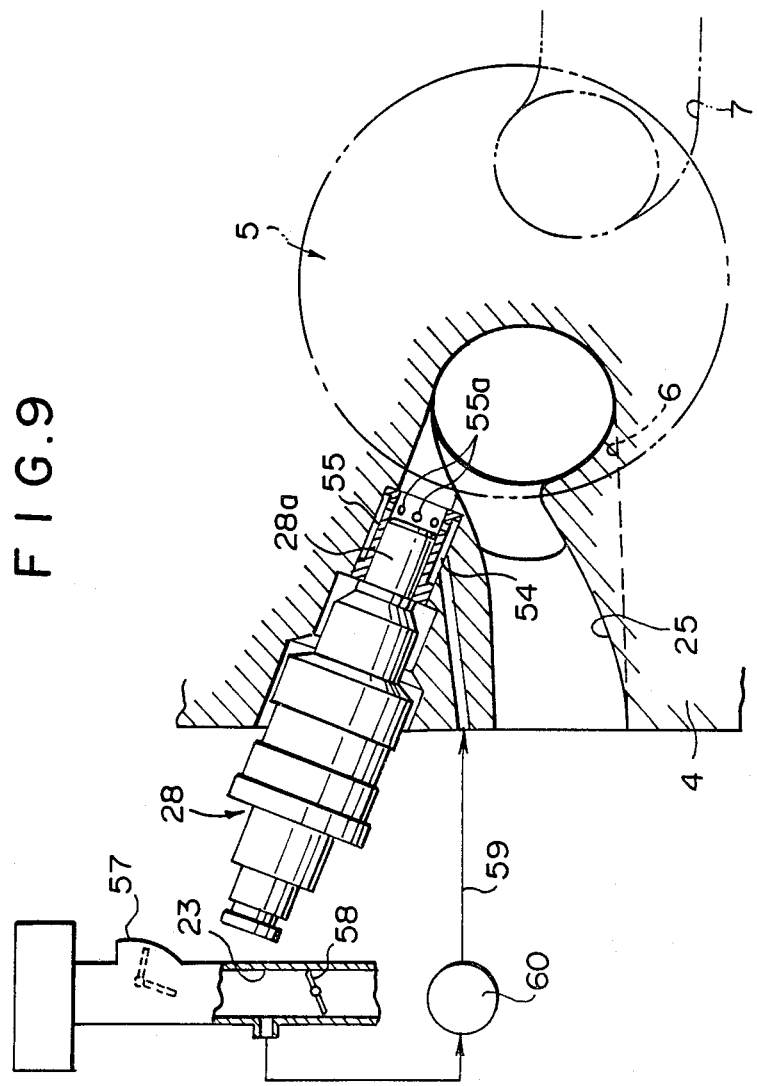
FIG. 9 is a horizontal sectional view of a cylinder head showing a further embodiment of the present invention.

In the embodiment shown in FIG. 9, the cylinder head 4 has substantially the same structure as in the embodiment shown in FIG. 8. In this embodiment, however, the fuel injection valve 28 is provided with a sleeve 55 which is located around the injection nozzle 28a of the injection valve 28. Around the sleeve 55, there is formed an annular space 54 between the sleeve 55 and the cylinder head 4. The annular space 54 is connected through a passage 59 with an air pump 60 which draws air from the intake passage 23 between an air flowmeter 57 and the throttle valve 58. Thus, air is pumped by the air pump 60 to the annular space 54. The sleeve 55 is formed at the tip end portion with a plurality of circumferentially arranged apertures 55a which connect the annular space 54 with the space in front of the injection nozzle 28a. It will therefore be understood that a pressurized air is discharged from the annular space 54 through the apertures 55a into the space in front of the fuel discharge nozzle 28a to enhance atomization of fuel discharged by the fuel injection valve 28. In conventional engines, such atomizing air is discharged under the pressure difference between the atmospheric pressure prevailing in the intake passage 26 upstream of the throttle valve 58 and the intake suction pressure in the combustion chamber 5, however, in a lean mixture combustion engine of the type being described, the engine is usually operated with a relatively wide throttle valve opening so that the aforementioned pressure difference is relatively small. For this reason, the air pump 60 is adopted in this embodiment. Since the air pump 60 draws air from the portion of the intake passage 26 downstream of the air flowmeter 57. This is advantageous in that the total amount of air introduced into the combustion chamber 5 will not be different from the measurement by the flowmeter 57.

Figure 10:
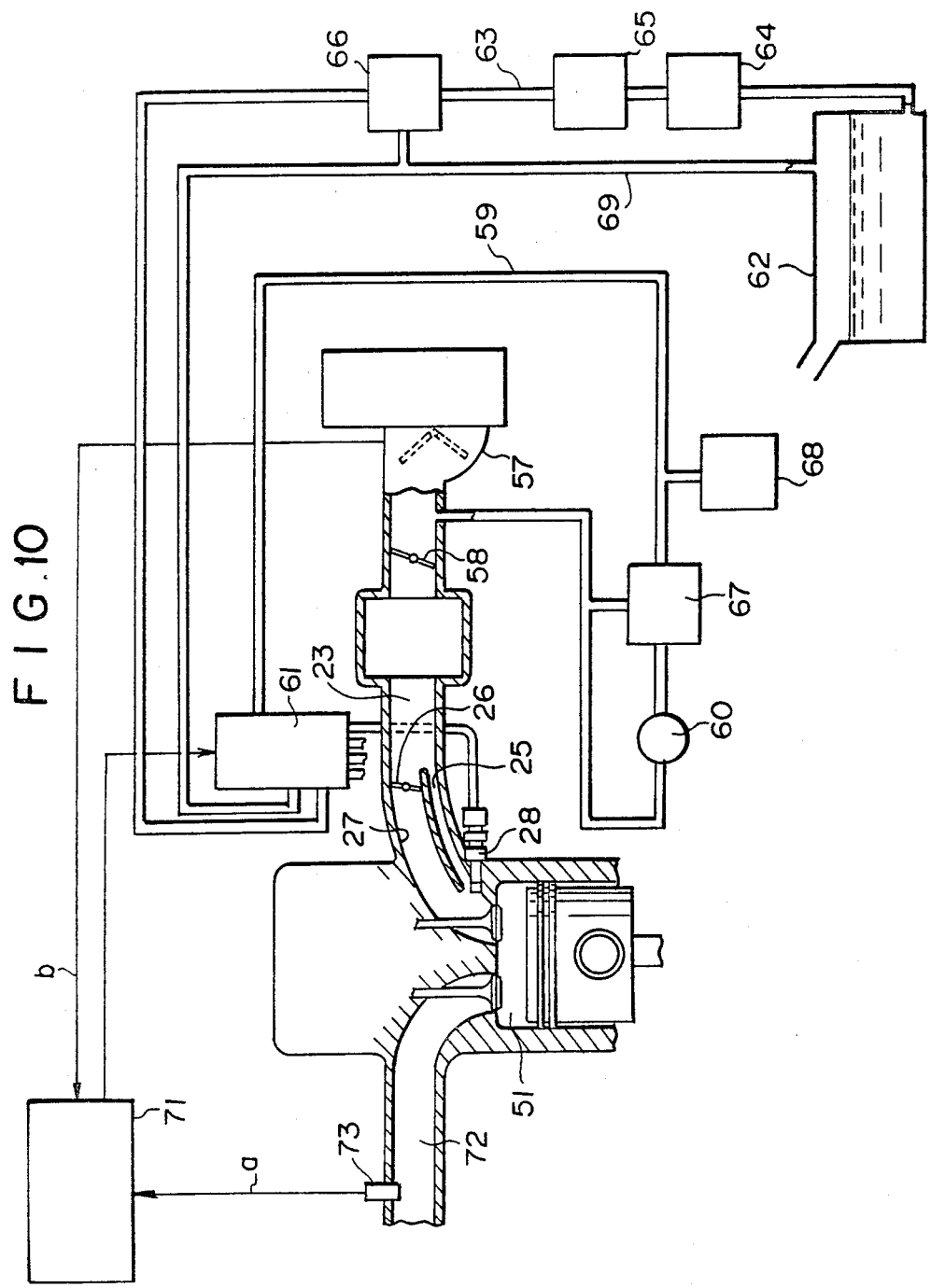
FIG. 10 is a diagrammatical view showing the general arrangement of the intake system.

Referring to FIG. 10, it will be noted that the fuel injection valve 28 provided in the auxiliary intake passage 25 at the junction between the passages 25 and 27 is connected with a fuel metering unit 61. The metering unit 61 is connected with a fuel tank 62 through a fuel supply passage 63 which is provided with a fuel strainer 64, a fuel pump 65 and a fuel pressure regulating valve 66. The metering unit 61 is further connected through an air passage 59 with an air pump 60 which draws air from the intake passage 23 as in the embodiment shown in FIG. 9. Between the air pump 60 and the metering unit 61, the air passage 59 is provided with an air pressure regulating valve 67 and an air accumulator 68.

In order to control the operation of the metering unit 61, there is provided a control unit 71 which picks up a signal from an air-fuel ratio detector 73 and an air flow signal from the air flowmeter 57. Between the metering unit 61 and the fuel tank 62, there is a return fuel passage 59 for returning excess fuel to the fuel tank 62.

In this embodiment, the metering unit 61 functions to meter the quantity of fuel to be supplied to the engine and the quantity of air to be preliminarily mixed with the fuel in the fuel injection valve 28. Thus, fuel is in advance mixed with air in the fuel injection valve and discharged into the combustion chamber 5.

Figure 11:
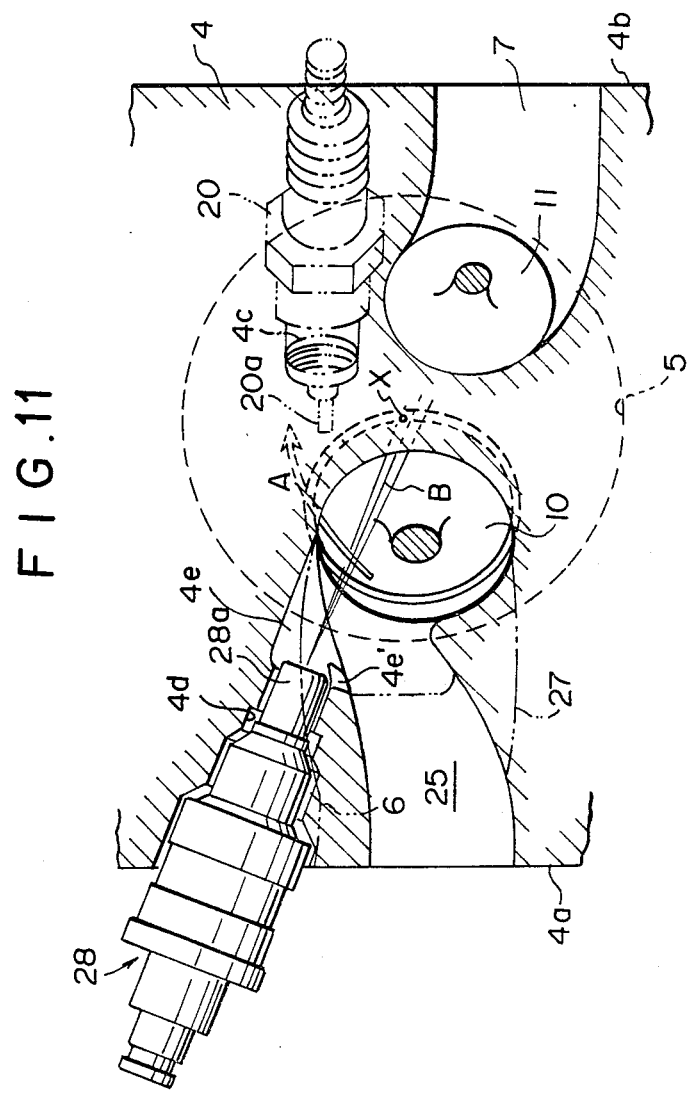
FIG. 11 is a horizontal sectional view of a cylinder head showing a further embodiment of the present invention.

Referring to FIG. 11, it will be noted that the embodiment shown therein has a cylinder head 4 which has a structure similar to that shown in FIG. 5. describing in more detail, the cylinder head 4 is formed at the end of the fuel injection vale installing hole 4d with a recess 4e where the injection nozzle 28a of the fuel injection valve 28 is located. In this arrangement, the injection nozzle 28a is not projected in the auxiliary passage 25 so that the intake air flow in the passage 25 is not made turbulent by the fuel injection valve 28. Thus, it is possible to produce a strong swirl in the combustion chamber 5. In case where the cylinder head 4 is formed at the upstream end portion of the recess 4e with a flow guide 4e', turbulence of air flow will further be prevented.

Figure 12:
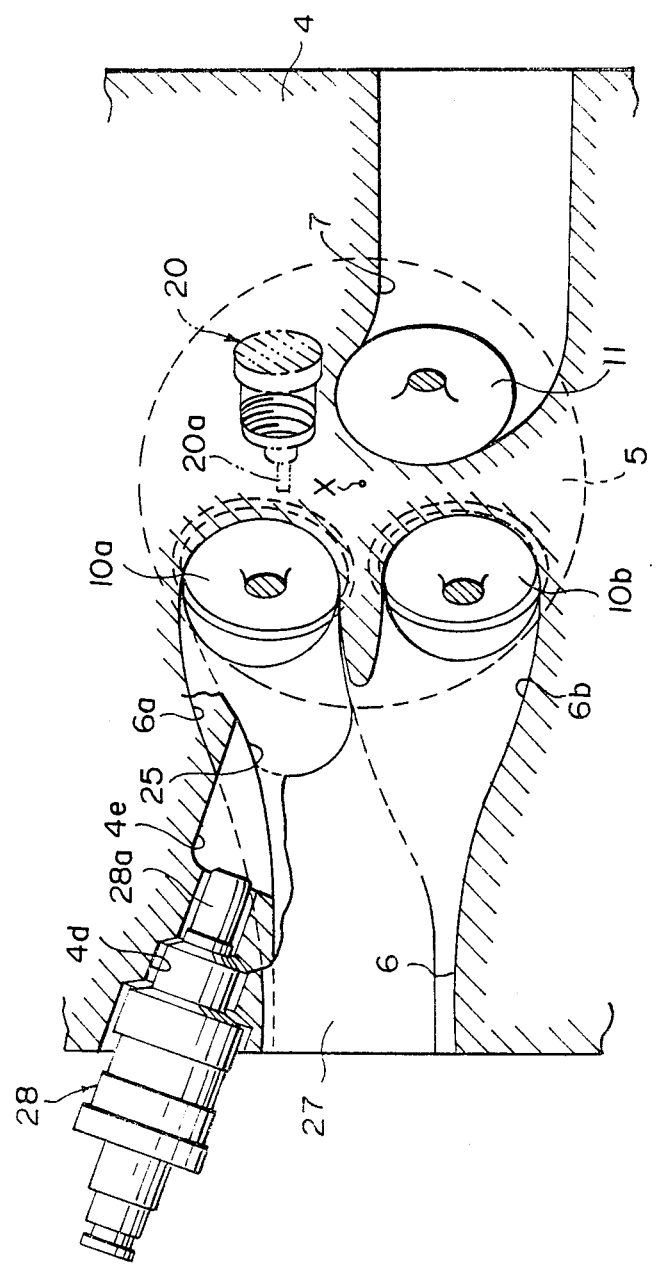
FIG. 12 is a sectional view similar to FIG. 11 but showing another embodiment of the present invention.

In the embodiment shown in FIG. 12, the cylinder head 4 is formed with a common intake port 6 which forms a part of the main intake passage 27 and divided into branch intake ports 6a and 6b provided respectively with intake valves 10a and 10b. Beneath the main intake passage portion 27, there is formed an auxiliary intake passage 25 as in the embodiment shown in FIGS. 1 through 3. The cylinder head 4 is further formed at a portion opposite to the branch port 6b with an exhaust port 7 which is provided with an exhaust valve 11. An ignition plug 20 having a discharge electrode 20a is mounted on the cylinder head at a portion offset from the center X of the combustion chamber 5 and opposite to the branch intake port 6a. At a side of the auxiliary intake passage 25, there is formed a recess 4e where the injection nozzle 28a of the fuel injection valve 28 is located. The recess 4e may be provided with a flow guide as the flow guide 4e' in the previous embodiment.

Figure 13:
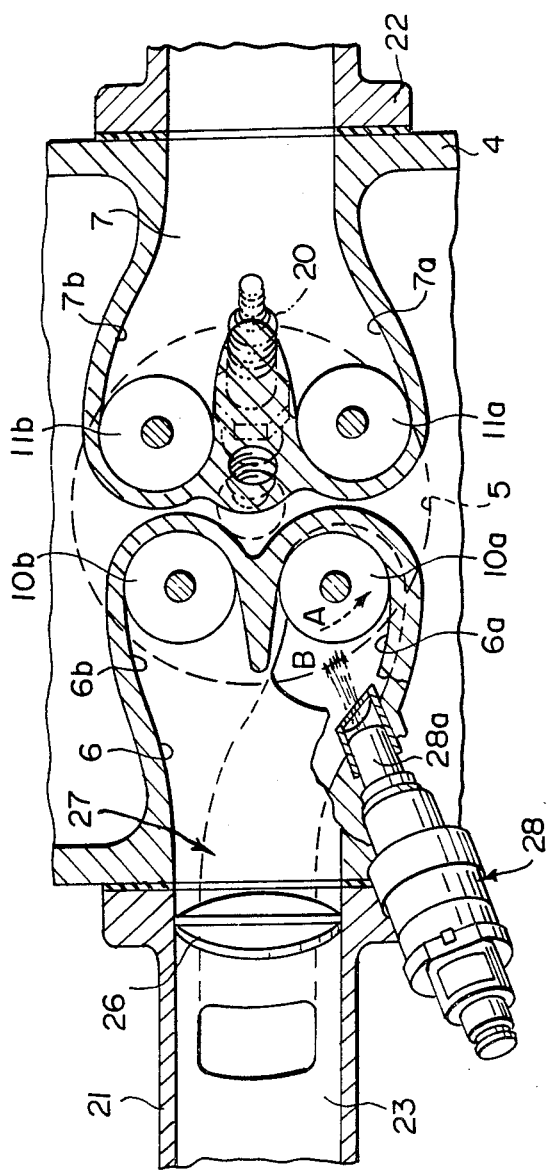
FIG. 13 is a horizontal sectional view showing still further embodiment.
Figure 14:
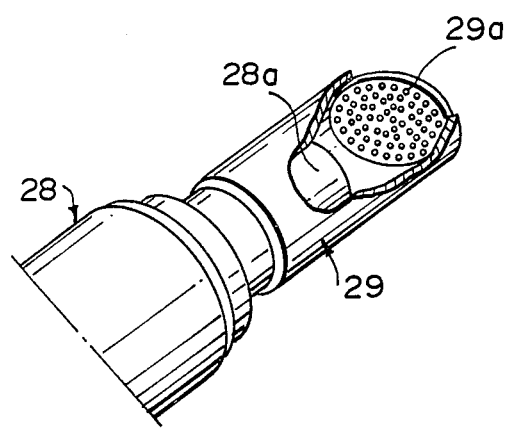
FIG. 14 is a perspective view of the fuel injection valve used in the embodiment of FIG. 13.

Referring to FIGS. 13 and 14, the embodiment shown therein has a cylinder head 4 which has a port arrangement as in the embodiment shown in FIGS. 1 and 2 so that corresponding parts are shown by the same reference numerals as in the embodiment of FIGS. 1 and 2 and detailed descriptions will not be made. In this embodiment, the fuel injection valve 28 is provided with a cylindrical cap 29 which is attached to the injection nozzle 28a. The injection valve 29 has an end formed with perforations 29a through which fuel is injected into the combustion chamber 5. It will therefore be understood that fuel atomization can be improved by the perforated end portion of the cap 29. It should further be noted that the cap 29 functions to protect the injection nozzle 28a from the combustion gas in the combustion chamber 5.

Figure 17:
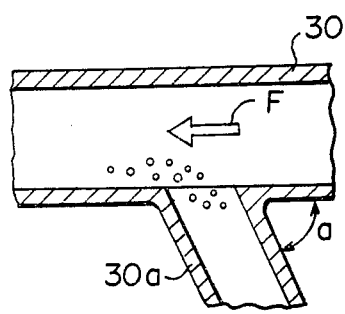
FIG. 17 is a sectional view of a fuel distribution pipe used in the embodiment of FIGS. 15 and 16.

Referring to FIGS. 15 through 17, there is shown a multiple cylinder engine in which each cylinder is constructed as in the embodiment of FIGS. 1 and 2 so that corresponding parts are shown by the same reference numerals as in FIGS. 1 and 2. In this embodiment, it will be noted that the fuel injection valves 28 for the respective cylinders are connected with a common fuel distributing pipe 30 through branch pipes 30a. Fuel is supplied through the distributing pipe 30 in the direction shown by an arrow F. It will be noted in FIGS. 16 and 17 that the branch pipe 30a forms an acute angle a with the direction of fuel flow F in the distributing pipe 30. With this arrangement, it is possible to exclude bubbles produced in the fuel distribution pipe 30 and in the branch pipes 30a since the bubbles in the branch pipes 30a are drawn under the suction pressure produced by the flow F in the distributing pipe 30 as shown in FIG. 17 and forced to flow out under the function of the fuel flow F in the pipe 30. This feature provides a particular advantage in an arrangement where the fuel injection valve is located close to the combustion chamber because there is an increased tendency of bubbles being produced due to the heat transmitted to the fuel in the distributing pipe 30.

It should further be noted that in this embodiment the branch pipes 30a have the same angle with respect to the distributing pipe 30 so that the static pressure which is applied to the inlet portions 28b of the fuel injection valves 28 is equalized and therefore an uniformized fuel distribution is ensured. Further, the branch intake ports 6a in the respective cylinders are curved in the same direction. Similarly, the ports 6b in the respetive cylinders are also curved in the same direction. The fuel injection valves 28 are located at the same sides of the associated intake ports 6a. The port arrangements and the locations of the fuel injection valves 28 for the respective cylinders are advantageous in avoiding mutual interference between the fuel injection valves 28 for the respective cylinders.

The invention has thus been shown and described with reference to specific embodiments, however, it should be noted that the invention is in no way limited to the details of the illustrated structures but changes and modifications may be made without departing from the scope of the appended claims.

We claim:

1. An engine intake system comprising combustion chamber means, main intake passage means leading to said combustion chamber means through intake port means, intake valve means provided in said intake port means, control valve means provided in said main intake passage means and adapted to be closed under an engine operating condition wherein an intake air flow is small in quantity and opened under an engine operating condition wherein the intake air flow is large in quantity, auxiliary intake passage means branched from said main intake passage means and opened to said intake port means in the vicinity of a portion where the intake port means is opened to said combustion chamber means, fuel injection means having nozzle means located in a portion wherein said auxiliary intake passage means is opened to the intake port means and having a direction of fuel injection oriented directly toward said intake port means and said combustion chamber means.

2. An engine intake system in accordance with claim 1 in which said intake valve means includes a valve member having a valve disc and a valve stem, said valve disc being adapted to be seated on a valve seat formed in said intake port means, said fuel injection valve means being positioned so that said direction of fuel injection is oriented to a space between the valve seat and the valve disc and offset from the valve stem when the intake valve means is opened.

3. An engine intake system in accordance with claim 2 in which said fuel injection valve means includes a fuel injection opening of an elongated configuration.

4. An engine intake system in accordance with claim 2 in which control means is provided for actuating the fuel injection valve means so that fuel injection takes place in a final period of an intake stroke.

5. An engine intake system in accordance with claim 2 which further includes ignition plug means provided in an upper portion of said combustion chamber means, said fuel injection valve means being located so that the direction of fuel injection is oriented toward the ignition plug means.

6. An engine intake system in accordance with claim 5 in which projecting means is provided in the combustion chamber means at a side of said ignition plug means opposite to the fuel injection valve means.

7. An engine intake system in accordance with claim 1 in which said auxiliary intake passage means is oriented in a tangential direction of the combustion chamber means, said fuel injection valve means being directed toward a center of a circle defining said combustion chamber means.

8. An engine intake system in accordance with claim 7 in which said intake port means includes a plurality of intake ports, said auxiliary intake passage means being connected to said main intake passage means at one of said intake ports.

9. An engine intake system in accordance with claim 7 in which said intake port means includes two intake ports, two exhaust ports being further formed at portions forming a square with said two intake ports, said ignition plug means being located substantially at a center of a circle defining said combustion chamber means.

10. An engine intake system in accordance with claim 7 in which said intake port means includes a first and second intake ports provided at an upper side portion of the combustion chamber means, ignition plug means being provided at the other side portion of the combustion chamber means to be opposite to said first intake port, an exhaust port being provided at a portion opposite to the second intake port.

11. An engine intake system in accordance with claim 1 in which said fuel injection valve means is provided with fuel atomizing means.

12. An engine intake system in accordance with claim 11 in which said fuel atomizing means includes a perforated plate located opposite to an injecting nozzle of the fuel injection valve means.

13. An engine intake system in accordance with claim 11 in which said fuel atomizing means includes means for injecting a stream of air to a stream of fuel injected from said fuel injection valve means.

14. An engine intake system in accordance with claim 11 in which said fuel atomizing means includes air mixing means for mixing a metered amount of fuel with air to provide an airfuel mixture and supplying the air-fuel mixture to the fuel injection valve means.

15. An engine intake system for a multiple cylinder engine, comprising a plurality of combustion chamber means, main intake passage means provided for each one of said combustion chamber means through intake port means to the combustion chamber means, intake valve means provided in said intake port means, control valve means provided in said main intake passage means and adapted to be closed under an engine operating condition wherein an intake air flow is small in quantity and opened under an engine operating condition wherein the intake air flow is large in quantity, auxiliary intake passage means branched from said main intake passage means and opened to said intake port means in the vicinity of a portion where the intake port means is opened to said combustion chamber means, fuel injection means provided for each combustion chamber means having nozzle means located in a portion wherein said auxiliary intake passage means is opened to the intake port means and having a direction of fuel injection oriented directly toward said intake port means and said combustion chamber means, the fuel injection valve means for the respective combustion chamber means being located at the same side of the intake port means.

16. An engine intake system in accordance with claim 15 in which fuel distributing pipe means is provided to extend in a direction of a row along which the combustion chamber means are arranged, said distributing pipe means being connected with said fuel injecting valve means through branch pipe means which makes an acute angle with respect to said fuel distributing pipe means as seen in a direction of fuel flow in the distributing pipe means.

17. An engine intake system in accordance with claim 1 in which said combustion chamber means has a longitudinal axis, said auxiliary intake passage means being branched from a bottom portion of said main intake passage means and extended in a direction substantially perpendicular to said longitudinal axis of the combustion chamber means, said fuel injection valve means being located so that the direction of fuel injection is oriented substantially paralelly with the direction of said auxiliary intake passage means as seen in a vertical plane.

18. An intake system in accordance with claim 1 in which said auxiliary intake passage means is located in a tangential direction of the combustion chamber means so that a swirl of intake air is produced in the combustion chamber means, ignition plug means being provided in the combustion chamber means at a portion where the swirl is produced, said fuel injection valve means being located so that the direction of fuel injection is oriented radially inwardly with respect to the ignition plug means.

19. An engine intake system comprising combustion chamber means, main intake passage means leading to said combustion chamber means through intake port means, intake valve means provided in said intake port means, control valve means provided in said main intake passage means and adapted to be closed under an engine operating condition wherein an intake air flow is small in quantity and opened under an engine operating condition wherein the intake air flow is large in quantity, auxiliary intake passage means branched from said main intake passage means and opened to said intake port means in the vicinity of a portion where the intake port means is opened to said combustion chamber means, fuel injection means having nozzle means located in a portion wherein said auxiliary intake passage means is opened to the intake port means and having a direction of fuel injection oriented to said combustion chamber means, said fuel injection means being mounted in a hole formed in cylinder head means and having an outlet opening located at said portion where said auxiliary intake passage means is opened to said combustion chamber means.

* * * * *